United States Patent

Blase

[11] 4,098,590
[45] Jul. 4, 1978

[54] EXPLOSIVE GAS PIPELINE

[75] Inventor: Manfred Blase, Essen, Germany

[73] Assignee: Didier Engineering GmbH, Essen, Germany

[21] Appl. No.: 718,192

[22] Filed: Aug. 26, 1976

Related U.S. Application Data

[63] Continuation of Ser. No. 562,155, Mar. 26, 1975, abandoned.

[30] Foreign Application Priority Data

Apr. 4, 1974 [DE] Fed. Rep. of Germany ....... 2416358

[51] Int. Cl.² ............................................... F17D 3/00
[52] U.S. Cl. .......................................... 48/192; 138/26;
202/270; 220/88 R; 428/36; 431/346
[58] Field of Search ..................... 138/37, 38, 39, 103,
138/111, 114, 155, 26; 48/192; 220/88 R, 88 A;
431/346; 181/55; 202/268, 270; 438/36

[56] References Cited

U.S. PATENT DOCUMENTS

| 832,523 | 10/1906 | Andersson | 138/120 |
|---|---|---|---|
| 1,290,422 | 1/1919 | Vale et al. | 431/346 |
| 2,403,188 | 7/1946 | McCollum | 431/346 |
| 2,417,670 | 3/1947 | Antles | 431/346 |
| 3,126,918 | 3/1964 | Eaton | 138/114 |
| 3,233,697 | 2/1966 | Slayter et al. | 181/55 |
| 3,380,810 | 4/1968 | Hamblin | 48/192 |
| 3,554,714 | 1/1971 | Johnson | 48/192 |

FOREIGN PATENT DOCUMENTS

| 604,164 | 8/1960 | Canada | 48/192 |
|---|---|---|---|
| 616,728 | 3/1961 | Canada | 48/192 |
| 616,732 | 3/1961 | Canada | 48/192 |

*Primary Examiner*—S. Leon Bashore
*Assistant Examiner*—Peter Kratz
*Attorney, Agent, or Firm*—Wenderoth, Lind & Ponack

[57] ABSTRACT

A gas pipe has positioned in the interior thereof, and along the entire length thereof, a loose gas displacement body formed of an incombustible material, such as mineral wool or glass wool. The body may be a hollow cylinder divided longitudinally, and further divided into partial bodies placed within the pipe in serial succession.

14 Claims, 2 Drawing Figures

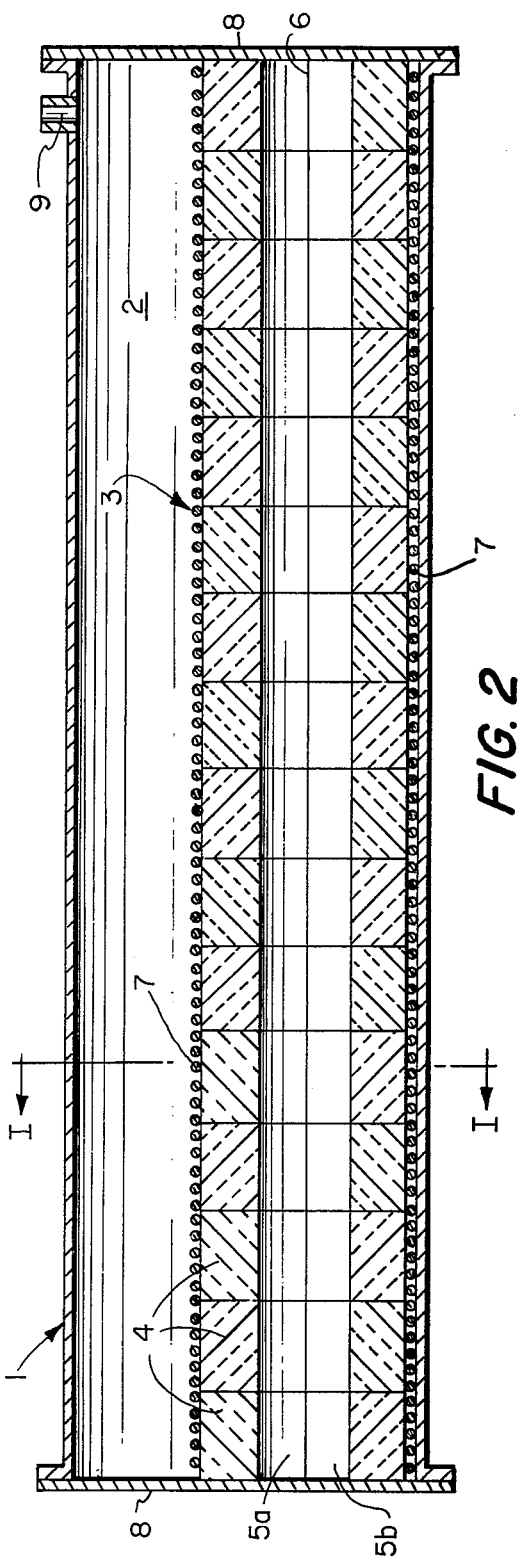
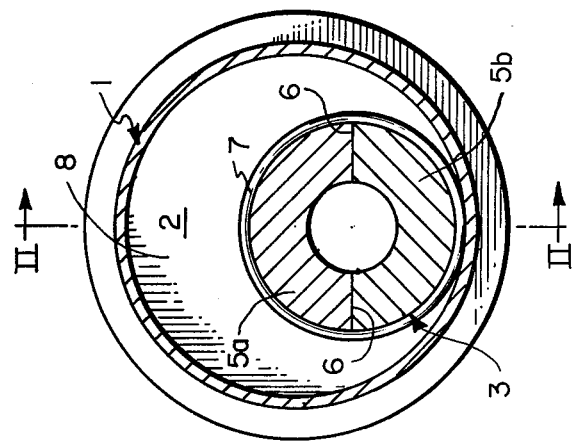

EXPLOSIVE GAS PIPELINE

This is a continuation, of application Ser. No. 562,155, filed Mar. 26, 1975, now abandoned.

BACKGROUND OF THE INVENTION

The invention relates to a gas duct or pipeline for conveying explosive gases or gas mixtures comprising an explosive gas as a component thereof. The present invention particularly relates to pipelines for installations supplied during operation alternately with combustible gases, and with oxygen-containing gases, and including equipment capable of gas ignition within the pipe of the gas pipeline.

In principle, whenever an explosive gas being conducted through a pipeline comes in contact with an oxygen-containing gas, or whenever a gas mixture having an explosive component is conducted through a pipeline, there exists the danger of an explosion of the gas, when the pipeline supplies an installation including equipment capable of discharging an igniting spark. Such danger exists particularly when the installation supplied by the pipeline is of the type which must be supplied alternately with different gases or gas mixtures through the same pipeline. An example of such an installation is a regenerative coke oven, which is heated with coal gas, and which is alternately charged at regular intervals with fuel gas and air. Such an installation is alternately supplied with coke oven gas and with decarbonizing air.

While the supply is changed from coke oven gas to decarbonizing air, or from air to the coke oven gas, a gas mixture containing both of these components is formed in the gas pipeline. Therefore, under certain conditions, namely an ignition, the two components exhibit the tendency to chemically react with the possible result being an explosion or detonation.

In order to avoid or reduce the danger of an explosion, the velocity of gas flow is ordinarily selected such that at the full power output of the supplied installation, a turbulent flow prevails in the pipelines and explosive gas mixtures thus appear only within a short length of the pipeline. However, in addition to the above mentioned full power output operation of the installation, there regularly appear further operational conditions, e.g., the heating-up phase of the coke oven installation or the operation thereof at throttled output, during which the velocity of flow in the gas pipelines must be reduced. However, such reduced flow velocities lead to the formation of a laminar condition of flow which leads to zones permitting mixing of the separate gas components, such zones extending through relatively long portions of the gas pipelines. Such long transition zones represent a considerable safety risk, since the danger of explosion in such long zones is substantially great, and since it is possible that once the explosion occurs, it may be propagated for a great distance within the gas pipeline, so that the destruction caused by the explosion assumes a corresponding considerable extent.

In the case of the coke oven installation mentioned above as a specific example, the initial ignition device which triggers the explosion consists of the burner head which is heated at least to the temperature of ignition.

SUMMARY OF THE INVENTION

The object of the present invention is to provide an improved gas pipeline or duct of the type mentioned above, and particularly such a pipeline wherein the risk of the occurrence of an explosion is reduced, or wherein the effects of an explosion once it occurs are dampened to an extent such that the gas pipeline is not damaged, and to thereby guarantee an immediate further operation of the supplied installation.

The above object is achieved in accordance with the present invention by loosely positioning a gas replacement or displacement element or body into the interior of the pipe of the pipeline. As shown by detailed tests, such a gas displacement element has a very advantageous effect on the explosion velocity and the explosion pressure if an explosion occurs. As indicated in even more detail below, the tests more specifically illustrate a reduction of the explosion velocity or velocity of propagation of an explosion by a factor of about 10 and a reduction of the explosion pressure by a factor of about 100. The reduction effected in both the explosion velocity and also in the explosion pressure is due to the fact that the insertion of the gas displacement element into the interior of the pipe produces an increased surface. Such reductions are also based on the fact that by the insertion of the gas displacement element into the pipe, there are obtained considerably higher gas velocities in the interior of the pipe, thereby substantially reducing the formation of relatively long transition zones of explosive gas mixtures.

Regarding possible materials of the gas displacement element, in accordance with the invention, there are preferrably employed non-combustible materials, and particularly such materials that are elastic or resilient. The present invention includes, in this connection, particularly the use of mineral (stone) wool or glass wool for the material of the gas displacement element. When a loose gas displacement element is made of such material, there is no danger of damage to the gas displacement element when an explosion occurs. Additionally, the elasticity of the gas displacement element exerts a positive effect on the velocity of propagation of explosions.

With regard to the geometrical shape of the gas displacement element, the present invention provides that the gas displacement element has a cylindrical shape and that the outer diameter of such cylindrical displacement element preferably be approximately two-thirds of the inner diameter of the gas pipe. Such dimension guarantees economically feasible conditions of flow with simultaneous safe operational capabilities, i.e. the simultaneous advantageous reduction of the explosion velocity and of the explosion pressure.

Further, the invention provides that the cylindrical gas displacement element preferrably be a hollow cylinder and that the inner diameter of such hollow cylindrical gas displacement element correspond approximately to one half of the outer diameter of the hollow cylindrical gas displacement element. Although the hollow cylindrical shape of the gas displacement element operates to reduce the velocity of gas flow at the same conveyed amounts of gas, which by itself would exert an undesirable effect on the velocity of propagation of an explosion, the hollow cylindrical shape of the gas displacement element simultaneously increases the total surface swept by the gas, so that all together approximately the same safety factor is again obtained. By achieving approximately the same safety factor, the advantage of a hollow cylindrical shape is the possibility of being able to employ less powerful gas conveying devices, such as pumps.

The gas displacement elements, possibly constructed in the form of hollow cylinders, may be cut or divided in the longitudinal direction of the pipe and held together at the outer surfaces by means of a truss, such as coiled wire. On the one hand, this arrangement makes it possible to use commercially available finished products, and on the other hand, it guarantees a greater strength or stability of the gas displacement element on the occurrence of explosions.

Finally, both with regard to the possibility of manufacturing the gas displacement elements and also with regard to the insertion thereof into the interior of the pipe, the invention provides that the gas displacement element should consist of a plurality of partial elements or segments inserted loosely one after another into the pipe interior, and that such partial elements should preferrably have a length of about one meter.

BRIEF DESCRIPTION OF THE DRAWINGS

The invention will be described in more detail below in connection with the accompanying drawings, wherein:

FIG. 1 is a transverse cross-section, taken along lines I—I in FIG. 2, through a gas pipeline in accordance with the present invention; and FIG. 2 is a longitudinal cross-section, taken along lines II—II in FIG. 1, through such pipeline, wherein the portion illustrated has a limited length as used in the experiments explained below.

DETAILED DESCRIPTION OF THE INVENTION

The gas pipeline of the present invention includes a conventional pipe 1, having a longitudinal passage 2 therethrough, with a loose gas replacement or displacement body or element 3 loosely positioned in passage 2. The outer diameter of gas displacement element 3 is preferrably approximately two-thirds of the diameter of pipe interior passage 2. Displacement element 3 in the form of a hollow cylinder has an inner diameter equal to approximately one-half the outer diameter thereof.

As particularly seen in FIG. 2, gas displacement element 3 consists of a plurality of partial longitudinal segments or elements 4 that are longitudinally inserted loosely one after another into pipe passage 2. As seen in FIG. 1, each partial element 4 consists of two half ring-shaped shells or elements 5a and 5b abutting each other at abutting surfaces 6. For holding together the two half shells 5a and 5b of each partial element 4, a truss element such as a wire 7 is wrapped externally around the periphery of each partial element 4. Such trussing preferrably includes separate wires led around the periphery of each partial element 4.

As seen especially in FIG. 2, gas displacement element 3 extends through the entire length of pipe passage 2. Preferrably gas displacement element 3 is formed either of stone or mineral wool or glass wool, or a similar material. Owing to the use of such materials, the gas displacement element possesses a very large surface that is contacted and swept by a flow of gas conveyed through passage 2. Additionally, gas displacement element 3 is resilient or elastic to a certain extent due to the use of such materials.

To illustrate the effectiveness of the invention, comparative tests were made on pipes, first without the gas displacement element of the invention, and then with the gas displacement element of the invention. In both cases, the pipes employed had an inner diameter of passage 2 of 125 mm. A gas mixture including a fuel gas (consisting of 30% methane and 70% hydrogen), to which an amount of air was admixed so that approximately 21% by volume of fuel gas was contained in the mixture, was formed and supplied to the pipe. This explosive mixture was ignited at one of the two pipe ends which were sealed by flanges or plates 8. The pipes on which the measurements were based had a total length of 16 m. A first measuring point was arranged at a distance of 5 m from the ignition point, and second and third measuring points were provided in each case at further spacings of 5 m. Detectors for measuring explosion pressure and the velocity of propagation of the explosion were positioned at each of the three measuring points. A further detector for determining explosion pressure was arranged at a fourth measuring point at the center of plate 8 positioned at the pipe end opposite the ignition point. A short distance in front of the plate 8 shown on the right hand side of FIG. 2, there was fitted a pipe coupling or fitting 9 having an opening of approximately 2 inches. Through pipe fitting 9, that could be closed in a conventional manner not illustrated, communication could be established between the interior 2 of the pipe and the ambient air or external environment. Closable pipe fitting 9 was provided in the tests in order to be able to determine whether the connection of pipe interior 2 to the surrounding atmosphere would exert a positive effect on the reduction of the explosion velocity and the explosion pressure.

The tests on a pipe that did not contain the displacement element 3 of the invention produced the results shown in Table 1. The results of the tests on a pipe that contained the gas displacement element 3 of the invention are shown in Table 2.

TABLE I

| Condition of Pipe Fitting | Primer | Velocity of Propagation of Explosion (m/s) | | | Pressure of Explosion (BAR) | | | |
|---|---|---|---|---|---|---|---|---|
| | | 0–5 m | 5–10 m | 10–15 m | 5 m | 10 m | 15 m | Opposite Plate or Flange 8 |
| CLOSED | IGNITION PLUG | 118 | 759 | 1670 | 7 | 11.4 | 41 | 65 |
| CLOSED | IGNITION HOUSING 2500 cm³, 2 CHEMICAL IGNITERS | 161 | 715 | 2000 | 11 | 15 | 28 | 50 |
| OPEN | IGNITION HOUSING | 161 | 715 | 2000 | 9.5 | 16 | 31 | 50 |

TABLE 2

| Condition of Pipe Fitting | Primer | Velocity of Explosion (m/s) | | | Pressure of Explosion (BAR) | | | |
|---|---|---|---|---|---|---|---|---|
| | | 0–5 m | 5–10 m | 10–15 m | 5 m | 10 m | 15 m | Opposite Plate or Flange 8 |
| CLOSES | IGNITION PLUG | 227 | 243 | 323 | 0.4 | 0.55 | 0.5 | 0.75 |

TABLE 2-continued

| Condition of Pipe Fitting | Primer | Velocity of Explosion (m/s) | | | Pressure of Explosion (BAR) | | | Opposite Plate or Flange 8 |
|---|---|---|---|---|---|---|---|---|
| | | 0–5 m | 5–10 m | 10–15 m | 5 m | 10 m | 15 m | |
| CLOSED | 2 CHEMICAL IGNITERS | 218 | 238 | 250 | 0.4 | 0.55 | 0.55 | 0.7 |
| CLOSED | IGNITION HOUSING 200 cm$^3$ IGNITION PLUG | 161 | 250 | 250 | 0.4 | 0.55 | 0.5 | 0.75 |
| OPEN | 2 CHEMICAL IGNITERS | 218 | 250 | 250 | 0.45 | 0.5 | 0.45 | 0.45 |
| OPEN | IGNITION HOUSING 200 cm$^3$ IGNITION PLUG | 147 | 250 | 250 | 0.4 | 0.5 | 0.4 | 0.35 |
| OPEN | IGNITION HOUSING 2500 cm$^3$ | 185 | 218 | 238 | 0.45 | 0.5 | 0.7 | 0.45 |

As can be seen from the results shown in the two Tables, the insertion of a gas displacement element 3 in accordance with the invention (which element used in the tests was in the form of a hollow element having an outer diameter of 100 mm and an inner diameter of 60 mm and made of stone or mineral wool) brought about a reduction of the velocity of the propagation of the explosion, at a point 15 m from ignition, by a factor of almost 10, and a reduction of the explosion pressure, at the plate 8 opposite ignition, by a factor of almost 100. The importance of such a considerable reduction of the explosion velocity and the explosion pressure will be readily apparent.

It will be apparent that various modifications may be made to the specific structural arrangements discussed above without departing from the scope of the invention.

What is claimed is:

1. In a gas duct or pipeline of the type including a pipe having a gas conveying interior therein, said gas conveying interior having longitudinally passing therethrough an explosive gas or a gas mixture including an explosive gas component, particularly for use in supplying an installation alternately with an inflammable gas and an oxygen-containing gas, said installation including equipment capable of igniting an explosive gas; the improvement comprising:
    means for limiting, in the longitudinal direction of said pipe, the velocity of propagation and pressure of an explosion of said gas occurring within said gas conveying interior of said pipe, said means consisting essentially of a hollow cylindrical loose gas displacement body formed of an elastic, resilient, noncombustible mineral wool material loosely positioned within said gas conveying interior of said pipe along substantially the entire length thereof, said displacement body having a transverse cross-sectional area substantially smaller than the transverse cross-sectional area of the interior of said pipe, and said displacement body having surfaces, extending in said longitudinal direction of said pipe, which are spaced from longitudinally extending inner surfaces of said pipe, whereby said displacement body fills a portion only of the volume of said gas conveying interior of said pipe, taken in a direction transverse to the direction of flow therethrough of said gas.

2. The improvement claimed in claim 1, wherein the outer diameter of said cylindrical displacement body is approximately two-thirds of the internal diameter of said pipe.

3. The improvement claimed in claim 1, wherein said hollow cylindrical displacement body has an internal diameter approximately equal to one half the external diameter thereof.

4. The improvement claimed in claim 1, wherein said displacement body is divided into separate elements along a plane extending longitudinally of said pipe and said body.

5. The improvement claimed in claim 4, further comprising truss means wrapped externally around said separate elements.

6. The improvement claimed in claim 1, wherein said displacement body comprises a plurality of separate partial bodies loosely inserted in serial succession in end-to-end abutting relationship longitudinally within said gas conveying interior of said pipe.

7. The improvement claimed in claim 6, wherein each of said partial bodies has a length of approximately one meter.

8. In a gas duct or pipeline of the type including a pipe having a gas conveying interior therein, said gas conveying interior having longitudinally passing therethrough an explosive gas or a gas mixture including an explosive gas component, particularly for use in supplying an installation alternately with an inflammable gas and an oxygen-containing gas, said installation including equipment capable of igniting an explosive gas; the improvement comprising:
    means for limiting, in the longitudinal direction of said pipe, the velocity of propagation and pressure of an explosion of said gas occurring within said gas conveying interior of said pipe, said means consisting essentially of a hollow cylindrical loose gas displacement body formed of an elastic, resilient, noncombustible glass wool material loosely positioned within said gas conveying interior of said pipe along substantially the entire length thereof, said displacement body having a transverse cross-sectional area substantially smaller than the transverse cross-sectional area of the interior of said pipe, and said displacement body having surfaces, extending in said longitudinal direction of said pipe, which are spaced from longitudinally extending inner surfaces of said pipe, whereby said displacement body fills a portion only of the volume of said gas conveying interior of said pipe, taken in a direction transverse to the direction of flow therethrough of said gas.

9. The improvement claimed in claim 8, wherein the outer diameter of said cylindrical displacement body is approximately two-thirds of the internal diameter of said pipe.

10. The improvement claimed in claim 8, wherein said hollow cylindrical displacement body has an internal diameter approximately equal to one half the external diameter thereof.

11. The improvement claimed in claim 8, wherein said displacement body is divided into separate elements along a plane extending longitudinally of said pipe and said body.

12. The improvement claimed in claim 11, further comprising truss means wrapped externally around said separate elements.

13. The improvement claimed in claim 8, wherein said displacement body comprises a plurality of separate partial bodies loosely inserted in serial succession in end-to-end abutting relationship longitudinally within said gas conveying interior of said pipe.

14. The improvement claimed in claim 13, wherein each of said partial bodies has a length of approximately one meter.

* * * * *